H. W. KOERNER.
PLANT SUPPORT.
APPLICATION FILED MAY 10, 1919. RENEWED JUNE 25, 1920.
1,359,388. Patented Nov. 16, 1920.
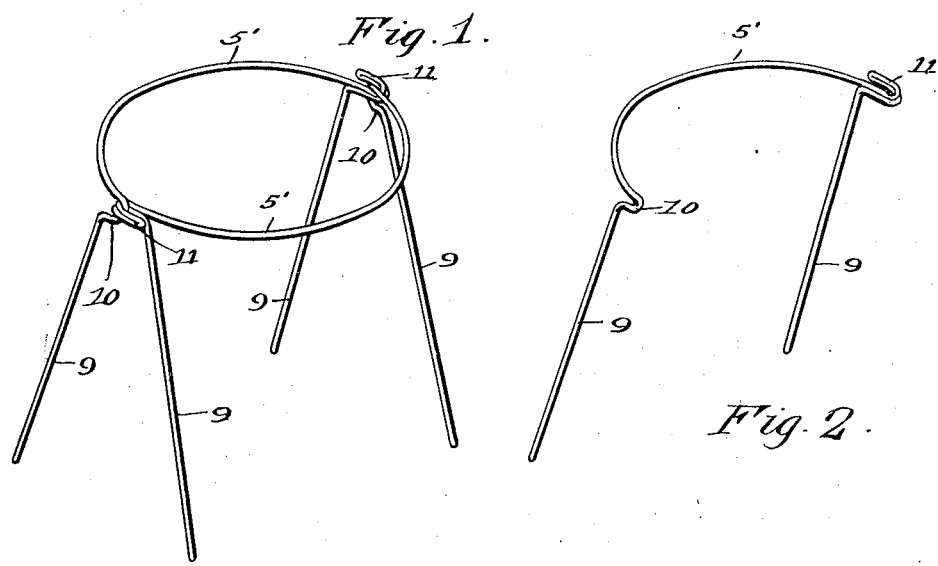
Witnesses
R. A. Thomas
Inventor
Herman W. Koerner
By Victor J. Evans
Attorney

UNITED STATES PATENT OFFICE.

HERMAN W. KOERNER, OF MILWAUKEE, WISCONSIN.

PLANT-SUPPORT.

1,359,388.    Specification of Letters Patent.    Patented Nov. 16, 1920.

Application filed May 10, 1919, Serial No. 296,131. Renewed June 25, 1920. Serial No. 391,834.

*To all whom it may concern:*

Be it known that I, HERMAN W. KOERNER, a citizen of the United States, residing at Milwaukee, in the county of Milwaukee and State of Wisconsin, have invented new and useful Improvements in Plant-Supports, of which the following is a specification.

This invention has reference to a support for small plants, such as carnations in green houses, etc., and the object of the invention is to produce an extremely simple, cheap and thoroughly efficient device for this purpose.

A further object of the invention is to produce a protector for small plants comprising two members each having means whereby the same is supported on the ground and having means for interengaging with one another to lock the sections assembled around the plant.

It is a further object of the invention to produce a plant protector constructed in two sections each from a strand of wire bent or shaped to provide supporting legs and rounded to provide a body portion, said body portions, at one side thereof being provided with eyes, and at the other side with hooks, and the hooks of the respective sections designed to coengage with the eyes of the co-acting sections whereby to removably connect the sections.

The foregoing objects, and others which will appear as the nature of the invention is better understood, may be accomplished by a simple construction, such as illustrated by the accompanying drawings, in which:

Figure 1 is a perspective view of the improvement.

Fig. 2 is a similar view of one of the sections thereof.

The improvement comprises two members, each including a substantially U-shaped body 5'.

The body 5' is semi-cylindrical or U-shaped. The body 5' of each of the sections constituting the construction illustrated in the drawing is provided at its ends with downwardly disposed outwardly inclined legs 9. At the juncture of one of the legs with each of the bodies 5' an eye 10 is formed, and the opposite end of each of the bodies is bent upon itself to form a hook 11. The hook of one of the body members is designed to co-engage in the eye of the coöperating body member when the sections are connected, the legs, of course, entering the earth and the legs and bodies inclosing the plant.

It is believed, from the foregoing description, when taken in connection with the drawings, the simplicity of the construction and the advantages thereof will be readily apparent without further detailed description.

Having thus described the invention, what is claimed as new, is:—

A plant protector comprising two coöperating wire members each including a semi-cylindrical body portion each having one of its ends bent to form a downwardly extending rounded portion providing an eye and the outer end of the eye bent to form an angularly extending leg, each body having its opposite end also rounded outwardly, extended in the direction of the body a short distance and from thence bent upon itself to provide an underlying portion that also extends beneath and underlies the body for a short distance and thence bent downwardly to form an angular leg, the first mentioned extension forming a hook designed to engage in the eye of the co-acting section when the sections are assembled.

In testimony whereof I affix my signature.

HERMAN W. KOERNER.